US009984075B2

(12) United States Patent
Bakshi et al.

(10) Patent No.: US 9,984,075 B2
(45) Date of Patent: May 29, 2018

(54) MEDIA CONSUMPTION CONTEXT FOR PERSONALIZED INSTANT QUERY SUGGEST

(71) Applicant: Google LLC, Mountain View, CA (US)

(72) Inventors: Dhruv Bakshi, Zurich (CH); Jakob Nicolaus Foerster, Zurich (CH)

(73) Assignee: Google LLC, Mountain View, CA (US)

( * ) Notice: Subject to any disclaimer, the term of this patent is extended or adjusted under 35 U.S.C. 154(b) by 182 days.

(21) Appl. No.: 14/875,855

(22) Filed: Oct. 6, 2015

(65) Prior Publication Data

US 2017/0097932 A1  Apr. 6, 2017

(51) Int. Cl.
*G06F 7/00* (2006.01)
*G06F 17/30* (2006.01)

(52) U.S. Cl.
CPC .. *G06F 17/30029* (2013.01); *G06F 17/30864* (2013.01); *G06F 17/30867* (2013.01)

(58) Field of Classification Search
CPC ......... G06F 17/30029; G06F 17/30864; G06F 17/30867
USPC ................ 707/722, 723, 767, 705, 706, 748
See application file for complete search history.

(56) References Cited

U.S. PATENT DOCUMENTS

| | | | | |
|---|---|---|---|---|
| 6,564,213 | B1 | 5/2003 | Ortega et al. | |
| 8,725,756 | B1* | 5/2014 | Garg | G06F 17/30902 707/750 |
| 2008/0183698 | A1 | 7/2008 | Messer et al. | |
| 2009/0106224 | A1* | 4/2009 | Roulland | G06F 17/30646 |
| 2010/0131902 | A1 | 5/2010 | Carlos et al. | |
| 2012/0084312 | A1* | 4/2012 | Jenson | G06F 17/3097 707/767 |
| 2012/0269116 | A1 | 10/2012 | Xing et al. | |
| 2015/0006564 | A1* | 1/2015 | Tomkins | G06F 17/30867 707/767 |
| 2015/0045434 | A1 | 2/2015 | Lim | |
| 2015/0046434 | A1 | 2/2015 | Lim | |
| 2016/0267128 | A1* | 9/2016 | Dumoulin | G06F 17/30401 |

OTHER PUBLICATIONS

Bar-Yossef and Kraus, "Context-Sensitive Query Auto-Completion," International World Wide Web Conference Committee, Mar. 28-Apr. 1, 2011, 10 pages.
Bast et al., "Output-Sensitive Autocompletion Search," Information Retrieval, 11(4):269-286, Aug. 2008.
Sullivan, "How Google Instant's Autocomplete Suggestions Work," Search Engine Land, Apr. 6, 2011 [retrieved on Sep. 8, 2015]. Retrieved from the Internet: URL<http://searchengineland.com/how-google-instant-autocomplete-suggestions-work-62592>, 15 pages.

(Continued)

*Primary Examiner* — Md I Uddin
(74) *Attorney, Agent, or Firm* — Fish & Richardson P.C.

(57) ABSTRACT

Methods, systems, and apparatus, including computer programs encoded on computer storage media, for generating suggested search queries. One method includes receiving, during a search session, a request for a suggested search query; in response to receiving the request for the suggested search query, identifying an entity that is associated with an item of media content; generating a suggested search query based on the identified entity; and providing data that causes the generated suggested search query to be presented in a user interface.

12 Claims, 5 Drawing Sheets

(56) References Cited

OTHER PUBLICATIONS

Unknown Author, "Using the Input Assistant," Wolfram, publically available before Sep. 4, 2015 [retrieved on Sep. 8, 2015]. Retrieved from the Internet: URL<http://reference.wolfram.com/language/tutorial/UsingTheInputAssistant.html>, 5 pages.
Wikipedia, "Autocomplete," Wikipedia, the free encyclopedia, Jun. 19, 2015 [retrieved on Sep. 4, 2015]. Retrieved from the Internet: URL<https://en.wikipedia.org/wiki/Autocomplete#Context_completion>, 7 pages.
Written Opinion issued in International Application No. PCT/US2016-052459, dated Oct. 27, 2017, 7 pages.
International Search Report and Written Opinion in International Application No. PCT/US2016/052459, dated Nov. 29, 2016, pp. 11.
International Preliminary Report on Patentability issued in International Application No. PCT/US2016/052459, dated Feb. 7, 2018, 18 pages.

* cited by examiner

MEDIA CONSUMPTION CONTEXT FOR PERSONALIZED INSTANT QUERY SUGGEST

TECHNICAL FIELD

This specification relates to search engines.

BACKGROUND

In general, a user can request information by inputting a query to a search engine. The search engine can process the query and can provide information for output to the user in response to the query.

SUMMARY

A system can identify content consumed by a user, as well as entities, e.g., actors, writers, musicians, directors, television networks, or other production companies, associated with consumed content. In response to receiving a request for a suggested search query during a search session, the system can generate suggested search queries based on identifying one or more entities that are associated with content consumed by the user.

Innovative aspects of the subject matter described in this specification may be embodied in methods that include the actions of receiving, during a search session, a request for a suggested search query; in response to receiving the request for a suggested search query, identifying an entity that is associated with an item of media content; generating a suggested search query based on the identified entity; and providing data that causes the generated suggested search query to be presented in a user interface.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations the method includes, in response to receiving the request for a suggested search query, identifying a candidate suggested search query that includes a trigger term; and in response to identifying the candidate suggested search query that includes a trigger term, identifying the entity that is associated with the item of media content.

In some implementations the trigger term is associated with a time window during the search session. In other implementations, the item of media content has been consumed during the time window.

In some cases, the item of media content is stored in a media consumption database that identifies one or more items that have been indicated as consumed by a user. In other cases the item of media content is indicated as currently being consumed by a user.

In some implementations the request for the suggested search query includes a snippet of audio data. In further implementations the snippet of audio data is audio data that represents the current background audio of a user.

In some cases the request for the suggested search query comprises a partial search query that includes one or more characters input by a user. In other cases the request for the suggested search query does not include any characters input by a user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for using the media consumption history of a user during a search session to bias or extrapolate the scoring of potential suggested search queries towards entities, e.g., singers, actors, musicians, writers, directors, television networks, or other production companies, that can be extracted from a user's media consumption history. A system can receive a request for a suggested search query, and in response to the request identify one or more entities that are associated with high scoring items of media content that are included in the media consumption history of the user. The system can generate one or more suggested search queries based on the identified entities.

Figure 1A:
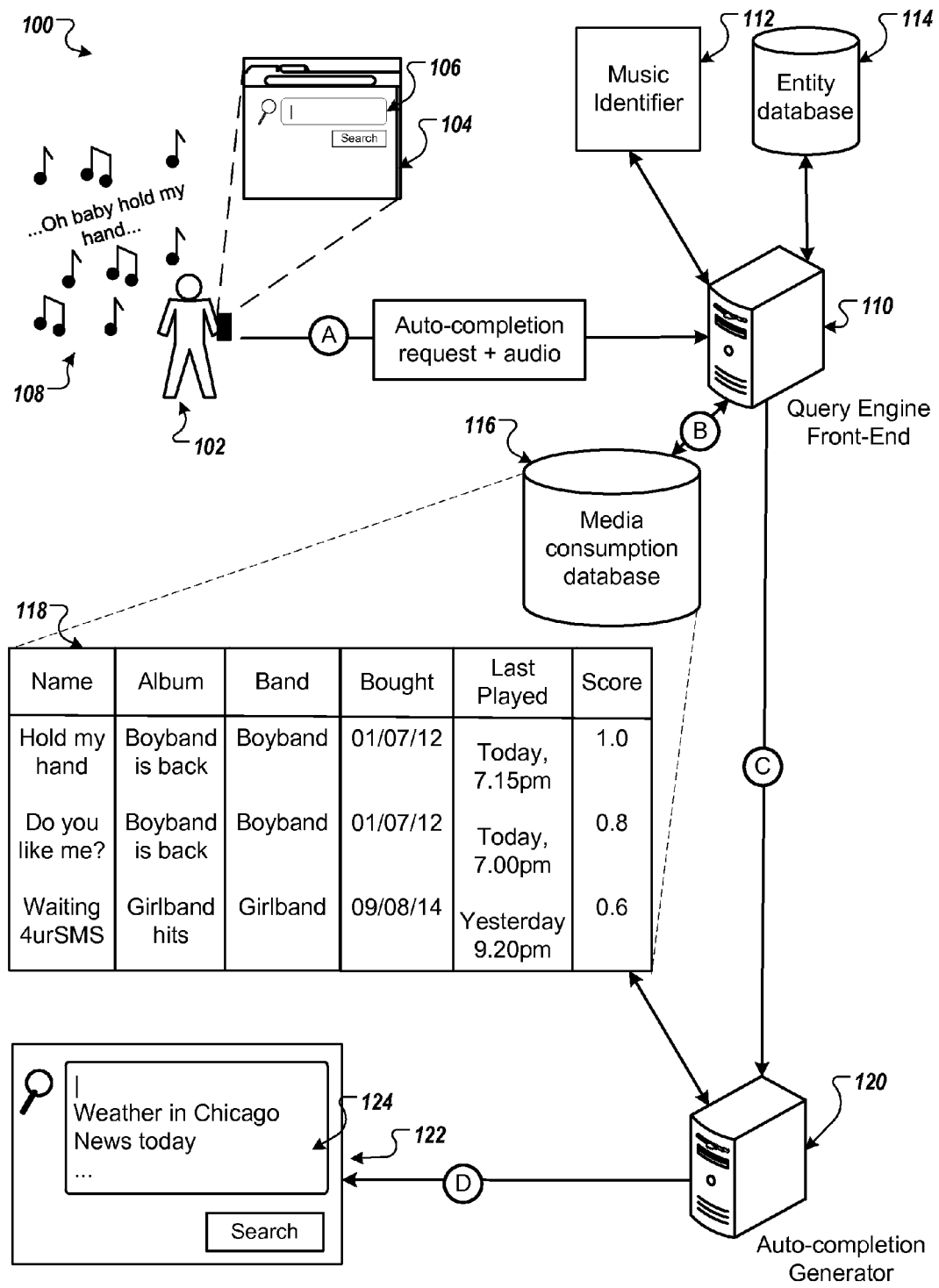
FIGS. 1A-1C depict an example system for providing personalized suggested search queries.
Figure 1B:
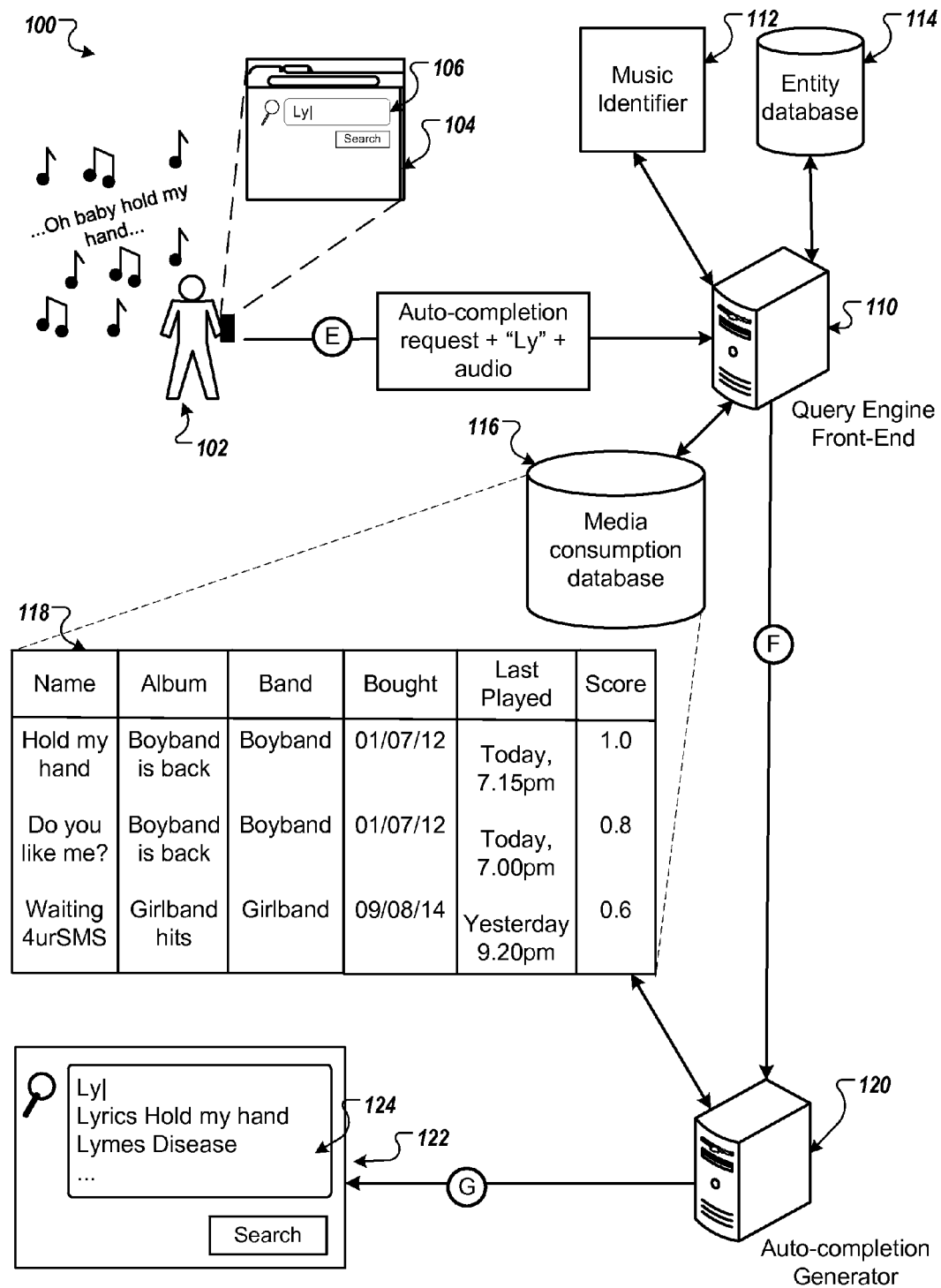
Figure 1C:
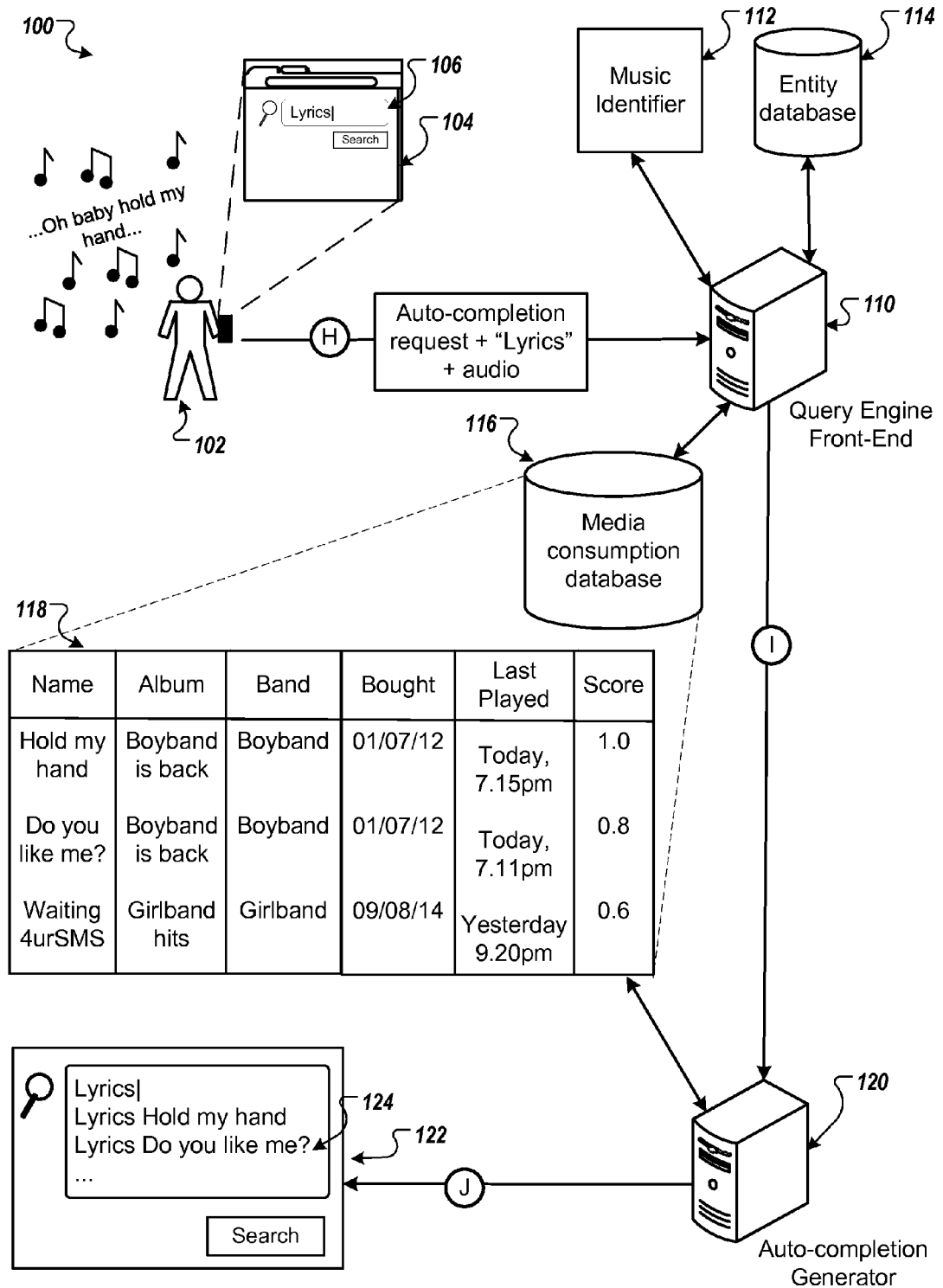

FIGS. 1A-1C depict an example system 100 for providing personalized suggested search queries. Specifically, the system 100 addresses an implementation in which a request for a suggested search query, i.e., an auto-completion of a search query, is received during a search session, and one or more personalized suggested search queries are provided in response to the request, where the one or more personalized suggested search queries are generated based upon media content that has been consumed by a user.

Briefly, the system 100 can receive a request for a suggested search query, such as a partial search query input by a user. The system 100 can identify one or more entities associated with one or more items of media content, and can generate suggested search queries based on identifying the one or more entities. A list of suggested search queries can be provided in response to the received request, e.g., as an output to the user by providing the list of suggested search queries in a search query entry field. The system 100 includes a client device 102, query engine front-end 110, music identifier 112, entity database 114, media consumption database 116 and auto-completion generator 120. The components of the system 100 can each be in communication over one or more networks, such as one or more LAN or WAN, or can be in communication through one or more other wired or wireless connections.

As depicted in FIG. 1A, during operation (A), i.e. during a search session, the query engine front-end 110 can receive a request for a suggested search query, e.g., an auto-completion request. For example, a user can begin a search query at the client device 102, e.g., by clicking in a search query input field "|," and data encoding the query request can be received by the query engine front-end 110. In some implementations, the query engine front-end 110 can receive the data encoding the new query request over one or more networks, or over one or more other wireless or wired connections.

The client device 102 can be a mobile computing device, such as a mobile phone, smart phone, personal digital assistant (PDA), music player, e-book reader, tablet computer, a wearable computing device, laptop computer, desktop computer, or other portable or stationary computing device. The client device 102 can feature a microphone, keyboard, touchscreen, or other interface that enables the user to input a query at the device. In some implementations, the user can provide the query at an interface that is presented or accessible from the client device 102. For example, the user can enter the query at a search engine that is accessible at the client device 102, can enter the query at a database that is accessible at the client device 102, or can provide the query at any other interface that features search capabilities, e.g., at a social network interface.

The user can provide a natural language query at the client device 102, such as by speaking one or more terms of a query, typing one or more terms of a query, selecting one or more terms of a search query, e.g., from a menu of available terms, selecting a query that comprises one or more terms, e.g., from a menu of available queries, or by providing a query using any other method. In other implementations, the user can provide a query using another method, for example, by selecting or submitting an image that the user would like to search for, by providing an audio or video sample of content that a user would like to search for, or by otherwise inputting a query at the client device 102.

The request for a suggested search query may include a snippet of background audio data taken from the surroundings of the client device. For example, a user of the client device 102 may be listening to music 108 that includes the lyrics "oh baby hold my hand" whilst inputting a search query at the client device. In other examples, a user of the client device may be listening to an audio book, or watching a movie or television program. The snippet of background audio data may include a sequence of multiple frames of data that correspond to a digital representation of the surroundings of the client device.

Data that includes the query input by the user and that identifies the snippet of background audio data can be received by the query engine front-end 110 in a single data packet or in multiple data packets. The data associated with the user-input query can further be received simultaneously, or can be received separately at different times.

After receiving the data encoding the query input by the user, the query engine front-end 110 can transmit the data associated with the user input query to the music identifier 112. For example, based on receiving data that includes the start of a user-input search query "|," and the snippet of audio data, the query engine front-end 110 can extract the snippet of audio data and can transmit the snippet of audio data associated with the search query to the music identifier 112.

The music identifier 112 can receive the snippet of audio data associated with the search query and identify information associated with the snippet of audio data. For example, the music identifier can identify information associated with a snippet of audio data that includes a name of a song or piece of music, one or more artists associated with the audio data, or a year in which the song or piece of music was produced. The music identifier 112 can transmit data associated with the identification of the snippet of audio data to the query engine front-end 110.

During operation (B), the query engine front-end 110 can transmit the data associated with the search query and the snippet of audio data to the media consumption database 116. The media consumption database 116 stores data identifying content consumed by the user and information associated with both the user's consumption of the content, e.g., when and where the user consumed the content, and the content itself, e.g., one or more entities associated with the content. For example, the query engine front-end 110 can identify a singer associated with a song that the user is identified as having listen to or bought, and the media consumption database can store information identifying the song, the user, the times and places where the user has listened to the song, and information identifying the singers in the band that sings the song.

As used in this specification, content can be identified as consumed by the user based on the user likely having viewed the content, listened to the content, read the content, or otherwise been exposed to the content or a portion of the content. Therefore, categorizing content items as content consumed by the user generally includes accessing data associated with the user that identifies content that the user is reasonably likely to have consumed and categorizing the identified content as content that has been consumed by the user. Content can include content items such as one or more movies, television shows, songs, albums, concerts, plays, recorded interviews, videos, books, magazines, newspapers, websites, or other web-based, audio, video, text, or mixed media content. Additionally, one or more entities may be associated with a content item, for example, one or more actors, directors, writers, singers, musicians, artists, photographers, editors, bands, record labels, production companies, television networks, radio networks or stations, companies, products, songs, soundtracks, etc. In some instances, a content item may be referred to as an entity, e.g., a movie, television show, song, etc., or an entity associated with a content item may be a content item in its own right, e.g., a soundtrack may constitute a content item.

Content that a user consumes can be identified by one or more sources that include any source that is capable of receiving information that indicates that particular content has been consumed by a user, or can include sources that are capable of determining content that has been consumed by the user. For example, content consumption sources can include any application, server or other system capable of receiving or accessing information identifying content consumed by a user, such as a social network, financial information or sources that provide proofs of purchase of a content item, a web history associated with the user, sources associated with actions performed by a user or requests input by a user for particular items of media content, or any other first party application or third party application on the client device.

As illustrated in FIG. 1A, the media consumption database includes information relating to music that is identified as consumed by the user of the client device 102. For example, the media consumption database includes the names of three songs that have been identified as consumed by the user, the album to which each song belongs, the band that performs each song, when the song was purchased by the user, when the user last listened to the song and a relevance score for each song. The relevance scores may indicate an extent to which a user is perceived to like or be interested in a particular content item. For example, the relevance score is higher for the song "Hold my hand", which has been identified using the snippet of audio data as currently playing, than the song "Waiting 4urSMS", which the user last played yesterday.

During operation (C), the auto-completion generator 120 can receive data encoding the suggested search query request "l," and data encoding the snippet of audio data. The auto-completion generator 120 can access the information stored in the media consumption database 116, as well as information stored by the music identifier 112 and the entity database 114, in order to identify an entity associated with an item of media content and generate one or more suggested search queries based on the identified entity. In some implementations, the auto-completion generator 120 may use the data encoding the search query request to identify one or more candidate suggested search queries that include one or more trigger terms before identifying an entity associated with an item of media content. Identifying candidate suggested search queries that include one or more trigger terms is described below with reference to FIGS. 1B and 1C.

During operation (D), the auto-completion generator 120 can provide data encoding one or more suggested search queries 124 to the client device 102 for presentation in a user interface 122. For example, as shown in FIG. 1A, based on receiving the indication that a user has started a new search query by clicking "l," in a search query field in the client device, the entities "Chicago" and "News" have been identified as relevant, and the auto-completion generator 120 has provided the suggested search queries "Weather in Chicago" and "News today." The example shown in FIG. 1A illustrates that in some implementations, such as receiving an indication that a user has begun a search query, the auto-completion generator may generate suggested search queries that do not include terms associated with the snippet of audio data that is received with the request for the suggested search query.

As depicted in FIG. 1B, during operation, (E), the query engine front-end 110 can receive a request for a suggested search query. For example, as shown in FIG. 1B, a user may submit a partial search query, e.g., "Ly|," at the client device 102, i.e., a search query that includes one or more characters, and data encoding the partial search query can be received by the query engine front-end 110. The request for the suggested search query may include a snippet of background audio data taken from the surroundings of the client device, e.g., a snippet of audio data that includes the music with lyrics "Oh baby hold my hand." In some implementations, the query engine front-end 110 can receive the data encoding the partial search query and the snippet of audio data over one or more networks, or over one or more other wireless or wired connections.

After receiving the data encoding the partial search query input by the user and the snippet of audio data, the query engine front-end 110 can transmit the data associated with the user input query to the music identifier 112. For example, based on receiving data that includes the start of a user-input search query "Ly|," and the snippet of audio data, the query engine front-end 110 can extract the snippet of audio data and can transmit the snippet of audio data associated with the partial search query to the music identifier 112.

The music identifier 112 can receive the snippet of audio data associated with the partial search query and identify information associated with the snippet of audio data. For example, the music identifier 112 may identify the snippet of audio data as a snippet of audio data taken from a song "Hold my hand", performed by the band "Boyband" in the album "Boyband is back." The music identifier 112 can transmit the information associated with the identification of the snippet of audio data to the query engine front-end 110.

The query engine front-end 110 may transmit the data associated with the partial search query and the information associated with the identification of the snippet of audio data to the media consumption database 116. The media consumption database 116 may process and store information relating to the partial search query and the snippet of audio data. For example, the media consumption database 116 may update the information relating to when the identified song "Hold my hand" was last player, and update the corresponding relevance score.

During operation (F), the query engine front-end 110 can transmit data encoding the partial search query "Ly|" and the snippet of audio data to the auto-completion generator 120. The auto-completion generator 120 can access the information stored in the media consumption database 116, as well as information stored by the music identifier 112 and the entity database 114, in order to identify an entity associated with an item of media content and generate one or more suggested search queries based on the identified entity.

In some implementations, the auto-completion generator 120 may use the data encoding the search query request to identify one or more candidate suggested search queries that include one or more trigger terms before identifying an entity associated with an item of media content. For example, based on the partial search query "Ly|," the auto-completion generator may identify one or more candidate suggested search queries such as "Lyrics in popsong," which includes the trigger term "lyrics," "Lyrics in girlband song," which also includes the trigger term "lyrics," "Lymes disease," which includes the trigger term "disease," or "Lymphoma symptoms," which includes the trigger term "symptoms." In some implementations, the trigger terms may be associated with a time window during the search session.

The auto-completion generator 120 may identify one or more entities that are associated with an item of media content using the media consumption database 116 in response to identifying one or more candidate suggested search queries that include one or more trigger terms. For example, the auto-completion generator may identify the candidate suggested search queries "lyrics in popsong" and "lyrics in girlband song" that include the trigger term "lyrics." The auto-completion generator 120 may use the trigger term "lyrics" to identify one or more entities that are associated with an item of media content using the media content database 116, for example the entity "Boyband," which has a high relevance score. The auto-completion generator 120 may generate one or more suggested search queries based on the one or more identified entities.

During operation (G), the auto-completion generator 120 can provide data encoding one or more suggested search queries 124 to the client device 102 for presentation in a user interface 122. For example, as shown in FIG. 1B, based on receiving the partial search query "Ly," the entities "Boyband" and "Lymes disease" may have been identified as relevant using the media consumption database 116, and the auto-completion generator 120 has provided the suggested search queries "Lyrics Hold my hand" and "Lymes disease." The example shown in FIG. 1B illustrates that in some implementations, such as receiving a partial search query, the auto-completion generator may generate suggested search queries that include terms that are not associated with the snippet of audio data, as well as search queries that include terms that are associated with the snippet of audio data that is received with the request for the suggested search query.

As depicted in FIG. 1C, during operation, (H), the query engine front-end 110 can receive a request for a suggested search query. For example, as shown in FIG. 1C, a user may submit a partial search query, e.g., "Lyrics|," at the client device 102, i.e., a search query that includes one or more characters, and data encoding the partial search query can be received by the query engine front-end 110. The request for the suggested search query may include a snippet of background audio data taken from the surroundings of the client device, e.g., a snippet of audio data that includes the music with lyrics "Oh baby hold my hand." In some implementations, the query engine front-end 110 can receive the data encoding the partial search query and the snippet of audio data over one or more networks, or over one or more other wireless or wired connections.

After receiving the data encoding the partial search query input by the user and the snippet of audio data, the query engine front-end 110 can transmit the data associated with the user input query to the music identifier 112. For example, based on receiving data that includes the start of a user-input search query "Lyrics|," and the snippet of audio data, the query engine front-end 110 can extract the snippet of audio data and can transmit the snippet of audio data associated with the partial search query to the music identifier 112.

The music identifier 112 can receive the snippet of audio data associated with the partial search query and identify information associated with the snippet of audio data. For example, the music identifier 112 may identify the snippet of audio data as a snippet of audio data taken from a song "Hold my hand", performed by the band "Boyband" in the album "Boyband is back." The music identifier 112 can transmit the information associated with the identification of the snippet of audio data to the query engine front-end 110.

The query engine front-end 110 may transmit the data associated with the partial search query and the information associated with the identification of the snippet of audio data to the media consumption database 116. The media consumption database 116 may process and store information relating to the partial search query and the snippet of audio data. For example, the media consumption database 116 may update the information relating to when the identified song "Hold my hand" was last played, and update the corresponding relevance score.

During operation (I), the query engine front-end 110 can transmit data encoding the partial search query "Lyrics|" and the snippet of audio data to the auto-completion generator 120. The auto-completion generator 120 can access the information stored in the media consumption database 116, as well as information stored by the music identifier 112 and the entity database 114, in order to identify an entity associated with an item of media content and generate one or more suggested search queries based on the identified entity.

In some implementations, the auto-completion generator 120 may use the data encoding the search query request to identify one or more candidate suggested search queries that include one or more trigger terms before identifying an entity associated with an item of media content. For example, based on the partial search query "Lyrics|," the auto-completion generator may identify one or more candidate suggested search queries such as "Lyrics in popsong," which includes the trigger term "lyrics," "Lyrics in girlband song," which also includes the trigger term "lyrics." In some implementations, the trigger terms may be associated with a time window during the search session.

The auto-completion generator 120 may identify one or more entities that are associated with an item of media content using the media consumption database 116 in response to identifying one or more candidate suggested search queries that include one or more trigger terms. For example, the auto-completion generator may identify the candidate suggested search queries "lyrics in popsong" and "lyrics in girlband song" that include the trigger term "lyrics." The auto-completion generator 120 may use the trigger term "lyrics" to identify one or more entities that are associated with an item of media content using the media content database 116, for example the entity "Boyband", which has a high relevance score. The auto-completion generator 120 may generate one or more suggested search queries based on the one or more identified entities.

During operation (J), the auto-completion generator 120 can provide data encoding one or more suggested search queries 124 to the client device 102 for presentation in a user interface 122. For example, as shown in FIG. 1C, based on receiving the partial search query "Lyrics," the entity "Boyband" may have been identified as highly relevant by the media consumption database, and the auto-completion generator 120 has provided the suggested search queries "Lyrics Hold my hand" and "Lyrics Do you like me?" The example shown in FIG. 1C illustrates that in some implementations, such as receiving a partial search query, the auto-completion generator may generate suggested one or more search queries that include terms associated with the snippet of audio data that is received with the request for the suggested search query. Generating suggested search queries based on identifying entities that are associated with items of media content is described in more detail below with reference to FIG. 2.

Figure 2:
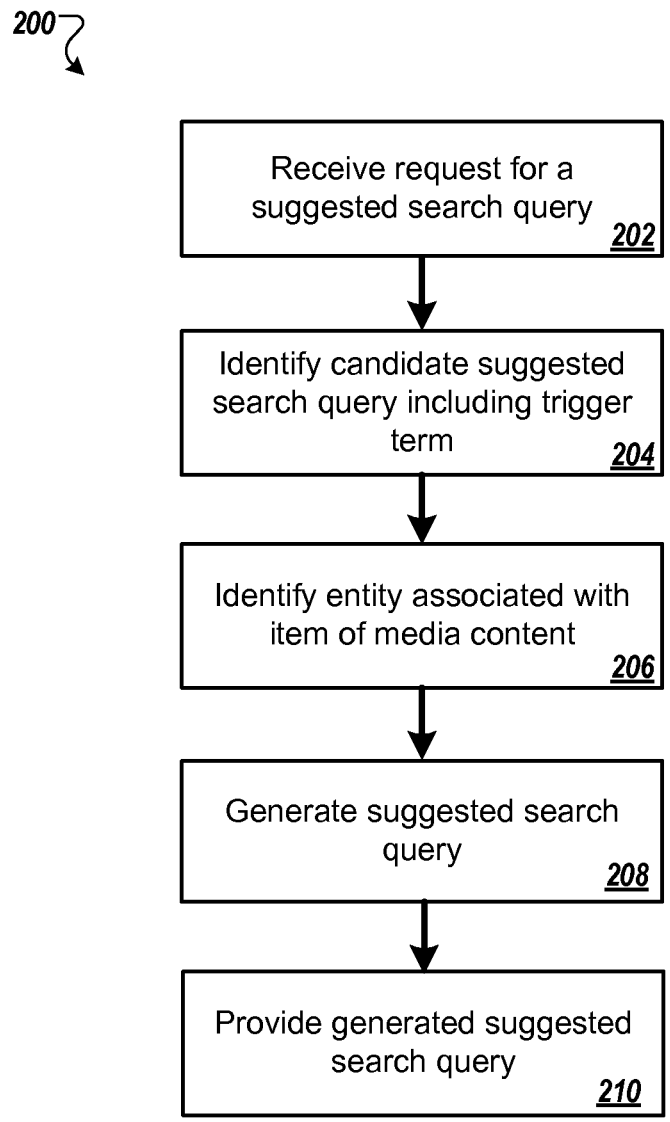
FIG. 2 depicts a flowchart of an example process for providing personalized suggested search queries.

FIG. 2 presents an example process 200 for providing personalized suggested search queries. For example, the process 200 can be performed by the system 100 in response to receiving a request for a suggested search query.

At step 202, a request is received for a suggested search query. The request is received during a search session. In some implementations, the request for the suggested search query includes a partial search query that, in turn, includes one or more characters input by a user. For example, the request for the suggested search query may include the terms "weather in |." In other implementations, the request for the suggested search query may not include any characters input by a user. For example, the request for the suggested search query may include an indication that the user has started a new search query, prior to the user inputting one or more characters, by clicking in the search query entry box.

The request for the suggested search query may include a snippet of audio data. For example, the suggested search query may include a snippet of audio data associated with an item of media content such as a song, movie, television program or audio book. In some implementations, the snippet of audio data is audio data that represents the current background audio of a user. For example, during a search session, a user may be listening to a song or audio book. The request for the suggested search query may then include a snippet of audio data that represents the current song that is playing or the book that is currently being read in the background. In another example, during a search session, a user may be watching a movie. The request for the suggested search query may then include a snippet of audio data that represents the movie that is currently playing in the background.

At step 204, in response to receiving the request for the suggested search query, a candidate suggested search query that includes a trigger term is identified. For example, a trigger term may be a term that can be identified with certain types. As an example, the trigger term "lyrics" may be identified with songs, music artists or songwriters. As another example, the trigger term "actors" may be identified with movies or television shows. The trigger term may include a partial trigger term that, in turn, includes one or more characters input by a user. For example, the trigger term may include the characters "lyri|."

At step 206, an entity that is associated with an item of media content is identified. For example, a set of entities may be extracted from a media consumption database associated with a user that stores information relating to items of media that have been consumed by the user. Each entity in the set of entities may be assigned a respective relevance score, for example indicating a recent consumption of a media item associated with the entity. The set of entities may be stored in a buffer, and the entity that is associated with the item of media content may be identified from among the set of entities stored in the buffer.

In some implementations, the entity that is associated with an item of media content may be identified in response to receiving the request for the suggested search query. In some cases, the item of media content may be stored in a media consumption database that identifies one or more items that have been indicated as consumed by a user. For example, the item of media content may be a music album that was previously bought by the user, or a movie that was previously watched by a user. In other cases, the item of media content may be indicated as currently being consumed by a user. For example, the user may be listening to a particular music album during the search session, or watching a particular movie.

In other implementations, the entity that is associated with an item of media content may be identified in response to identifying a candidate suggested search query that includes a trigger term, as described above with reference to step 204. For example, in response to identifying the candidate suggested search query "lyrics in popsong" that includes the trigger term "lyrics", an entity relating to songs, music artists, or song writers that is associated with an item of media content may be identified. As another example, in response to identifying the candidate suggested search query "actors in actionfilm" that includes the trigger term "actors", an entity relating to movies, television shows, actors/actresses, or movie directors that is associated with an item of media content may be identified.

In some implementations, the trigger term is a term that is associated with a time window during the search session. In further implementations, the item of media content will have been consumed by the user during the time window that is associated with the identified trigger term. For example, the trigger term "lyrics" may be associated with a time window that includes two hours prior to receiving the request for a suggested search query, during which the user listened to a particular music album. In another example, the trigger term "actors" may be associated with a time window that includes the last twenty-four hours prior to receiving the request for the suggested search query, during which the user watched a particular movie.

At step 208 a suggested search query that is based on the identified entity is generated.

At step 210 data that causes the generated suggested search query to be presented in a user interface is provided. Presentations of user interfaces, e.g., user interface 122, that provide personalized suggested search queries are described above with reference to FIGS. 1A-1C.

Figure 3:
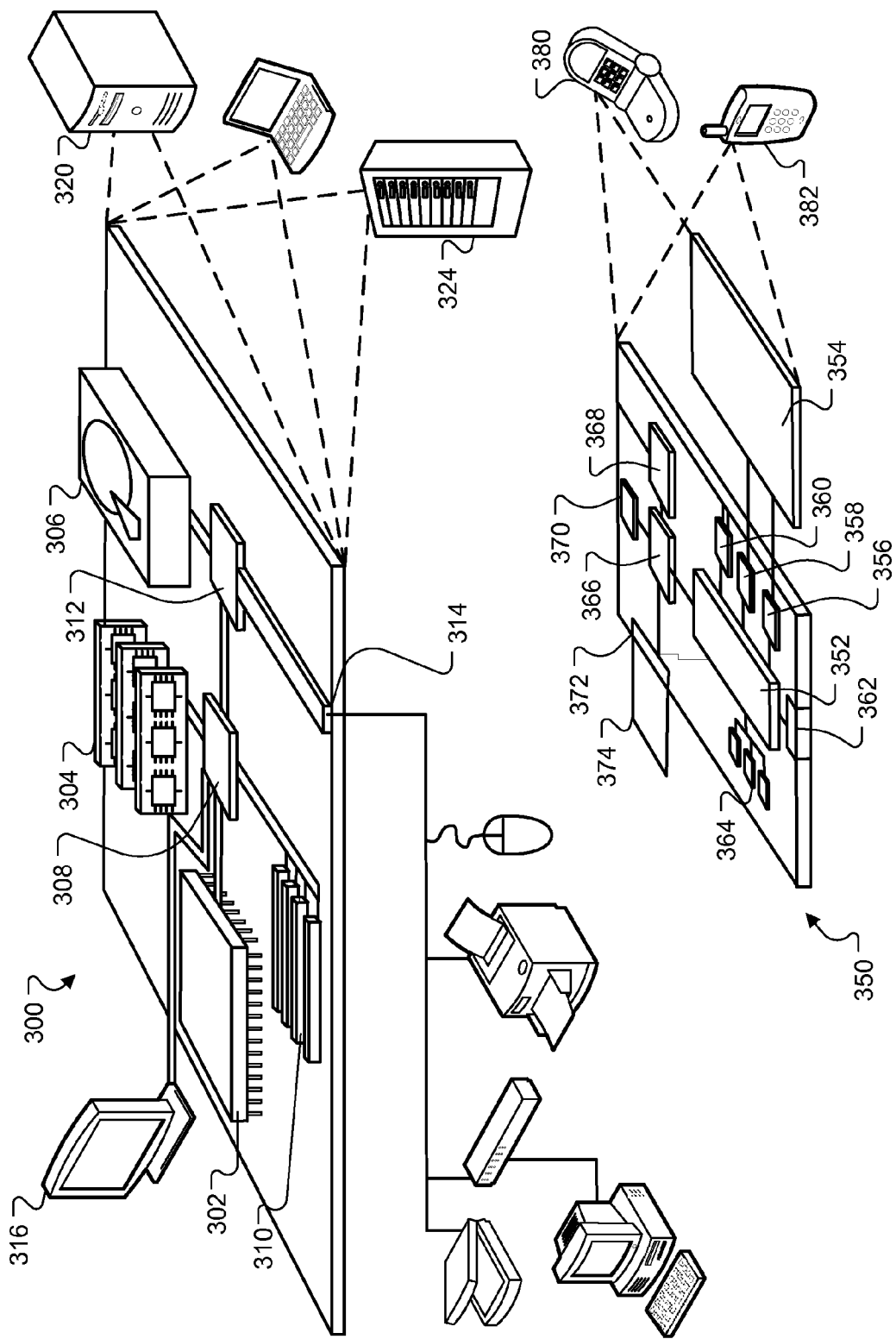
FIG. 3 is a diagram showing an example of a system that may be used to implement the systems and methods described in this document.

FIG. 3 shows an example of a computing device 300 and a mobile computing device 350 that can be used to implement the techniques described above. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analogue and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer implemented method comprising:
   receiving, in a single message during a search session and by a front end of a search system that includes (i) the front end, (ii) a media identifier, (iii) an entity identifier, and (iv) an autocompletion generator, both (a) a request for a suggested search query that identifies one or more characters that were typed into a client device by a user of the client device, and (b) background audio data comprising audio that played in a background in a vicinity of the client device within a time window in relation to the search session, and that does not include sounds that are made by the user of the client device;
   identifying a candidate suggested search query that includes a trigger term that is associated with the time window;
   identifying, by the media identifier of the search system, a song, movie, or show that is associated with the audio that was playing in the background in the vicinity of the client device;
   identifying, by the entity identifier of the search system, an entity that is associated with the song, movie or show that is associated with the audio that was playing in the background in the vicinity of the client device, based at least on a relevance score for the entity that reflects a recency of consumption of the song, movie or show that is associated with the entity;
   generating, by the autocompletion generator of the search system, a suggested search query based on (i) the identified entity that is associated with the song, movie or show that is associated with the audio that was playing in the background in the vicinity of the client device, and (ii) the one or more characters that were typed into the client device by the user of the client device; and
   providing, by the front end of the search system, data that causes the generated suggested search query to be presented in a user interface on the client device.

2. The method of claim 1, wherein the song, movie, or show comprises media content that has been indicated as consumed during the time window.

3. The method of claim 1, wherein the song, movie, or show is stored in a media consumption database of the search system that identifies one or more items that have been indicated as consumed by the user.

4. The method of claim 1, wherein the song, movie, or show is indicated in a media consumption database of the search system as currently being consumed by the user.

5. The method of claim 1, wherein the request for the suggested search query comprises a partial search query that includes the one or more characters.

6. A system comprising:
   one or more computers and more or more storage devices storing instructions that are operable, when executed by the one or more computers, to cause the one or more computers to perform operations comprising:
   receiving, in a single message during a search session and by a front end of a search system that includes (i) the front end, (ii) a media identifier, (iii) an entity identifier, and (iv) an autocompletion generator, both (a) a request for a suggested search query that identifies one or more characters that were typed into a client device by a user of the client device, and (b) background audio data comprising audio that played in a background in a vicinity of the client device within a time window in relation to the search session, and that does not include sounds that are made by the user of the client device;
   identifying a candidate suggested search query that includes a trigger term that is associated with the time window;
   identifying, by the media identifier of the search system, a song, movie, or show that is associated with the audio that was playing in the background in the vicinity of the client device;
   identifying, by the entity identifier of the search system, an entity that is associated with the song, movie or show that is associated with the audio that was playing in the background in the vicinity of the client device, based at least on a relevance score for the entity that reflects a recency of consumption of the song, movie or show that is associated with the entity;
   generating, by the autocompletion generator of the search system, a suggested search query based on (i) the identified entity that is associated with the song, movie or show that is associated with the audio that was playing in the background in the vicinity of the client device, and (ii) the one or more characters that were typed into the client device by the user of the client device; and providing, by the front end of the search system, data that causes the generated suggested search query to be presented in a user interface on the client device.

7. The system of claim 6, wherein the song, movie or show comprises media content that has been indicated as consumed during the time window.

8. The system of claim 6, wherein the song, movie or show is stored in a media consumption database of the search system that identifies one or more items that have been indicated as consumed by the user.

9. The system of claim 6, wherein the song, movie or show is indicated in a media consumption database of the search system as currently being consumed by the user.

10. The system of claim 6, wherein the request for the suggested search query comprises a partial search query that includes the one or more characters.

11. A non-transitory computer-readable storage device encoded with a computer program, the program comprising instructions that, if executed by one or more computers, cause the one or more computers to perform operations comprising:

receiving, in a single message during a search session and by a front end of a search system that includes (i) the front end, (ii) a media identifier, (iii) an entity identifier, and (iv) an autocompletion generator, both (a) a request for a suggested search query that identifies one or more characters that were typed into a client device by a user of the client device, and (b) background audio data comprising audio that played in a background in a vicinity of the client device within a time window in relation to the search session, and that does not include sounds that are made by the user of the client device;

identifying a candidate suggested search query that includes a trigger term that is associated with the time window;

identifying, by the media identifier of the search system, a song, movie, or show that is associated with the audio that was playing in the background in the vicinity of the client device;

identifying, by the entity identifier of the search system, an entity that is associated with the song, movie or show that is associated with the audio that was playing in the background in the vicinity of the client device, based at least on a relevance score for the entity that reflects a recency of consumption of the song, movie or show that is associated with the entity;

generating, by the autocompletion generator of the search system, a suggested search query based on (i) the identified entity that is associated with the song, movie or show that is associated with the audio that was playing in the background in the vicinity of the client device, and (ii) the one or more characters that were typed into the client device by the user of the client device; and providing, by the front end of the search system, data that causes the generated suggested search query to be presented in a user interface on the client device.

12. The device of claim 11, wherein the song, movie or show comprises media content that has been indicated as consumed during the time window.

* * * * *

UNITED STATES PATENT AND TRADEMARK OFFICE
CERTIFICATE OF CORRECTION

PATENT NO. : 9,984,075 B2
APPLICATION NO. : 14/875855
DATED : May 29, 2018
INVENTOR(S) : Bakshi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this
Eighteenth Day of December, 2018

Andrei Iancu
*Director of the United States Patent and Trademark Office*